United States Patent [19]

Itoh et al.

[11] Patent Number: 4,828,710
[45] Date of Patent: May 9, 1989

[54] METHOD FOR THE EXTRACTION OF WATER FROM MACROMOLECULAR SOLUTIONS

[75] Inventors: Hiroshi Itoh, Yokohama; Toshimi Nakagawa, Fujisawa; Atsuhiko Nitta, Yokohama; Tomio Tanaka, Tokyo; Hideo Kamio, Odawara, all of Japan

[73] Assignee: Mitsui Toatsu Chemicals, Incorporated, Tokyo, Japan

[21] Appl. No.: 76,983

[22] Filed: Jul. 21, 1987

Related U.S. Application Data

[60] Continuation of Ser. No. 836,745, Mar. 6, 1986, abandoned, which is a division of Ser. No. 662,147, Oct. 18, 1984, abandoned.

[30] Foreign Application Priority Data

Oct. 22, 1983 [JP] Japan .......................... 58-197875
May 28, 1984 [JP] Japan .......................... 59-106464
May 28, 1984 [JP] Japan .......................... 59-106467

[51] Int. Cl.$^4$ .............................................. B01D 15/00
[52] U.S. Cl. ................................. 210/675; 210/689
[58] Field of Search ................ 210/689, 690, 670, 675

[56] References Cited

U.S. PATENT DOCUMENTS 3,658,745  4/1972  Merrill et al. ............... 210/689
4,074,039  2/1978  Lim et al. .................... 526/303
4,395,524  7/1983  Emmons et al. .............. 526/307.2
4,555,344 11/1985  Cussler ........................ 210/689

OTHER PUBLICATIONS

Polymer Bulletin 7, 107–113 (1982).
Journal of Polymer Science: Polymer Symposium 66, 209–219 (1979).
European Polymer Journal 17, 361–366 (1981).

*Primary Examiner*—Ivars Cintins
*Attorney, Agent, or Firm*—Fisher, Christen & Sabol

[57] ABSTRACT

This invention pertains to a water-insolubilized resin of a polymer of at least one monomer selected from N-alkyl- or N-alkylene-substituted acrylamides or methacrylamides represented by the following general formula (I):

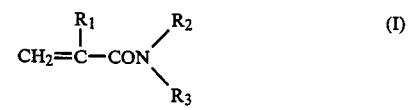

wherein $R_1$ and $R_2$ mean individually a hydrogen atom or methyl group and $R_3$ denotes a methyl, ethyl or propyl group, with the proviso that $R_3$ is an ethyl or propyl group when $R_2$ stands for a hydrogen atom, and that $R_3$ is a methyl or ethyl group when $R_2$ stands for a methyl group, or wherein $R_2$ and $R_3$ form $-(CH_2)_4-$ or $-(CH_2)_2-O-(CH_2)_2-$ in combination; or a copolymer of at least one monomer selected from the acrylamides or methacrylamides and another copolymerizable monomer. The resin has water-absorbing capacity which varies in degree depending on temperature and, when heated, undergoes shrinkage even in the presence of a large excess of water to release once-absorbed water. Because of this property, it may be used as a water-separating agent to remove water from a water-containing system. Since the resin can exhibit a sort of molecular sieve action, it can selectively control the concentration of a macromolecular material without affecting the concentration of a low molecular weight compound such as a buffer agent. The resin is useful particularly in concentrating an aqueous solution or emulsion containing a material susceptible to thermal denaturation, such as an edible substance, amino acid, protein, polysaccharide or, enzyme which is difficult to concentrate by the evaporation technique, and also in controlling the concentration of an aqueous solution while adjusting the degree of water-absorbing capacity of the resin by varying its temperature.

4 Claims, No Drawings

METHOD FOR THE EXTRACTION OF WATER FROM MACROMOLECULAR SOLUTIONS

This application is a continuation of application Ser. No. 836,745, filed Mar. 6, 1986, which is a division of Ser. No. 662,147, filed Oct. 18, 1984, both now abandoned.

BACKGROUND OF THE INVENTION (a) Field of the Invention

This invention relates to an agent for separating water from a water-containing system, and more specifically to a water-separating agent having water-absorbing capacity, which varies in degree depending on temperature, is capable of absorbing and retaining water therein and, when heated, is capable of undergoing shrinkage even in the presence of a large excess of water so as to release the thus-retained water.

(b) Description of the Prior Art

Separation of water has been routinely practiced in such process steps as concentration of aqueous solutions, crystallization from aqueous solutions and production of pure water.

As specific techniques useful in the practice of such process steps, may be mentioned inter alia (1) separation of water through such membranes as reverse osmosis membranes and ultrafiltration membranes; and (2) separation of water by making use of phase change of water such as the multi-stage flash distillation method or lyophilizing method. There techniques have already found commercial utility. However, none of these conventional techniques are fully satisfactory. Thus, a variety of improvements has been attempted.

Recently, resins capable of absorbing and retaining water in amounts several hundreds times their own weights have been developed. These resins are generally called higher water-absorbing resins and they are now being applied in various fields. These resins are however accompanied by the following problems:

(1) After absorbing water, the above resins may be regenerated only when heated to drive off the thus-absorbed water. When their regeneration is contemplated for reuse, enormous costs are required.

(2) The amounts of water which the above resins can absorb vary depending on whether the water is pure water or salt water. The amounts will generally decrease in salt water, in some instances to as little as one twentieth of that in pure water.

(3) After absorbing water, the above resins may not be fully satisfactory in dynamic characteristics, especially in shape-retaining capacity.

On the other hand, various physical properties of diverse water-retaining gels have recently been measured. From results of such measurements, it has been found that the water content of water-retaining gels at equilibrium is dependent on the temperature [Journal of polymer Science: Polymer Symposium 66, 209–219 (1979); European Polymer Journal 17, 361–366 (1981); Polymer Bulletin 7, 107–113 (1982)]. It may thus be suggested that there is a chance to develop a water-separating technique making use of such gels under various temperatures. From the practical standpoint, the extent of the swelling of such gels at low temperatures are however not as large as the data given in the above literature. Furthermore, differences in water-absorbing capacity at various temperatures are not satisfactorily large. It has not been investigated how fast such gels would swell or shrink when their temperatures are changed. They are however very unlikely to undergo fast swelling or shrinkage even when their temperatures are changed.

The present inventors have carried out an extensive research with the foregoing in view. As a result, it has been discovered that a water-insolubilized polymer or copolymer of certain specific acryl or methacryl amide derivatives can absorb water and can thus swell to a large degree even at low temperatures, that water-absorbing capacity can vary to a great degree due to temperature changes and that this change in water-absorbing capacity takes place extremely rapidly. Therefore, this water-insolubilized polymer or copolymer has been found to be extremely useful as a water-separating agent from the practical viewpoint.

SUMMARY OF THE INVENTION

An object of this invention is to provide a water-separating agent permitting ready regeneration while making use of its temperature-dependent swelling and shrinkage characteristics.

Another object of this invention is to provide a water-separating agent, the water-absorbing capacity of which does not decrease too much even when an inorganic salt is present concurrently.

A further object of this invention is provide a water-separating agent excellent in shape-retaining capacity even after absorption of water.

A still further object of this invention is to provide a water-separating agent permitting separation of water with smaller energy consumption.

A still further object of this invention is to provide a water-separating agent which may be used to concentrate an aqueous solution containing a material susceptible to thermal denaturation or to control the concentration of such an aqueous solution.

Accordingly, the present invention provides the following water-separating agent:

A water-separating agent suitable for use in removing water from a water-containing system, which agent comprises a water-insolubilized resin of a polymer of at least one monomer selected from N-alkyl- or N-alkylene-substituted acryl or methacrylamides represented by the following general formula (I):

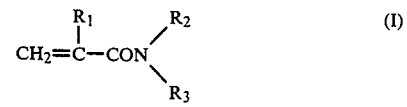

wherein $R_1$ and $R_2$ mean individually a hydrogen atom or methyl group and $R_3$ denotes a methyl, ethyl or propyl group, with the proviso that $R_3$ is an ethyl or propyl group when $R_2$ stands for a hydrogen atom, and that $R_3$ is a methyl or ethyl group when $R_2$ stands for a methyl group, or wherein $R_2$ and $R_3$ form $-(CH_2)_4-$ or $-(CH_2)_2-O-(CH_2)_2-$ in combination; or of a copolymer of at least one monomer selected from the acrylamides or methacrylamides and another copolymerizable monomer, said agent having water-absorbing capacity which varies in degree depending on temperature and, when heated, undergoing shrinkage even in the presence of a large excess of water to release already-absorbed water. The water-containing system can be, for example, an aqueous solution or emulsion containing macromolecular material.

DETAILED DESCRIPTION OF THE INVENTION

In the present invention, the water-insolubilized polymer or copolymer has typically the property that, when its aqueous solution is heated, it is rendered hydrophobic to develop cloud in the aqueous solution. However, the water-insolubilized polymer or copolymer should not necessarily be limited to a polymer or copolymer equipped with this property. Any polymers or copolymers may be used as long as their water-absorbing capacity levels vary depending on temperature. These polymers or copolymers have amphiphilic properties. In other words, they have broad solubility in that they are equipped with such hydrophilic and hydrophobic properties that they can be dissolved not only in water but also in an organic solvent such as benzene.

As examples of the above-described polymer and copolymer, may be mentioned polymers and copolymers of at least one of the following N-alkyl- or N-alkylene-substituted acryl and methacryl amides:

Amide

N-n-Propylacrylamide
N-n-Propylmethacrylamide
N-Isopropylacrylamide
N-Isopropylmethacrylamide
N-Ethylacrylamide
N-Ethylmethacrylamide
N,N-Dimethylacrylamide
N,N-Dimethylmethacrylamide
N-Methyl-N-ethylacrylamide
N-Methyl-N-ethylmethacrylamide
N-Acryloylpyrrolidine
N-Methacryloylpyrrolidine
N-Acryloylmorpholine
N-Methacryloylmorpholine As will become apparent from data which will be described herein, resins obtained by insolubilizing polymers or copolymers of the following monomers are not preferred in view of their swelling characteristics:

(1) N-monoalkyl-substituted acrylamides and methacrylamides in the general formula (I), wherein when $R_2$ and $R_3$ mean a hydrogen atom and alkyl group, respectively, the alkyl group contains 4 or more carbon atoms as in N-butylacrylamide or N-butylmethacrylamide;

(2) N,N-dialkyl-substituted acrylamides and methacrylamides, N-methyl-N-propylacrylamide or N-methyl-N-propylmethacrylamide of the general formula (I) in which $R_2$ and $R_3$ denote a methyl group and propyl group, respectively, and those represented by the general formula (I) in each of which the total number of carbon atoms of the alkyl group is 4 or more as in N,N-diethylacrylamide or N,N-diethylmethacrylamide; and (3) N-alkylene-substituted acrylamides those represented by the general formula (I) in which $R_2$ and $R_3$ forms a group and, as in N-acryloylpiperidine or N-methacryloylpiperidine, n is 5 or greater.

In addition, one or more monomers selected from for example hydrophilic monomers, ionic monomers and hydrophobic monomers may additionally be copolymerized in order to control the amount of water to be absorbed and to improve the shape-retaining capacity of the water-absorbed resin.

As exemplary hydrophilic monomers, may be mentioned acrylamide, methacrylamide, N-methylacrylamide, N-methylmethacrylamide, diacetoneacrylamide, hydroxyethyl methacrylate, hydroxyethyl acrylate, hydroxypropyl methacrylate, hydroxypropyl acrylate, various methoxypolyethyleneglycol methacrylates, various methoxypolyethyleneglycol acrylates, N-vinyl-2-pyrrolidone, N-acryloyl alanine and N-methacryloyl alanine. Further, vinyl acetate or glycidyl methacrylate for example may be introduced by copolymerization, followed by hydrolysis to impart hydrophilicity.

Illustrative of such ionic monomers are acids such as acrylic acid, methacrylic acid, vinylsulfonic acid, allylsulfonic acid, methallylsulfonic acid, styrenesulfonic acid, 2-acrylamido-2-phenylpropanesulfonic acid and 2-acrylamido-2-methyl-propanesulfonic acid and their salts; amines such as N,N-dimethylaminoethyl methacrylate, N,N-diethylaminoethyl acrylate, N,N-dimethylaminopropyl methacrylamide and N,N-dimethylaminopropylacrylamide and their salts. Further, it is also possible to impart ionic properties by introducing various acrylates, methacrylates, acrylamides, methacrylamides or acrylonitriles by copolymerization and then hydrolyzing the thus-introduced moieties.

As hydrophobic monomers, may for example be mentioned N-alkylacrylamide derivatives and N-alkylmethacrylamide derivatives such N-n-butylacrylamide, N-n-butylmethacrylamide, N-tert-butylacrylamide, N-tert-butylmethacrylamide, N,N-diethylacrylamide, N,N-diethylmethacrylamide, N-acryloylpiperidine, N-methacryloylpiperidine, N-n-hexyl-acrylamide, N-n-hexylmethacrylamide, N-n-octylacrylamide, N-n-octylmethacrylamide, N-tert-octylacrylamide, N-n-dodecylacrylamide, N-n-dodecylmethacrylamide and the like; N-(ω-glycidoxyalkyl)acrylamide derivatives and N-(ω-glycidoxyalkyl)methacrylamide derivatives such as N,N-diglycidylacrylamide, N,N-diglycidylmethacrylamide, N-(4-glycidoxybutyl)acrylamide, N-(4-glycidoxybutyl)methacrylamide, N-(5-glycidoxypentyl)acrylamide, N-(6-glycidoxyhexyl)acrylamide and the like; acrylate derivatives and methacrylate derivatives such as ethyl acrylate, methyl methacrylate, butyl methacrylate, butyl acrylate, lauryl acrylate, 2-ethylhexyl methacrylate and glycidyl methacrylate; acrylonitrile; methacrylonitrile; vinyl acetate; vinyl chloride; olefins such as ethylene, propylene and butene; styrene; α-methylstyrene; butadiene; and isoprene.

The acceptable proportion of such a hydrophilic, ionic or hydrophobic monomer to the acrylamide or methacrylamide derivative may vary depending on the combination of the acrylamide or methacrylamide derivative and the above-mentioned monomer. Although not sweepingly applicable to every combination, the hydrophilic, ionic and hydrophobic monomers may generally be used in amounts of 60 wt.% or less, 30 wt.% or less and 60 wt.% or less, respectively.

As a method for making a polymer of the above-described monomer insoluble in water, the polymer may be insolubilized to water either upon polymerization or by subjecting it to treatment after polymerization. As specific insolubilizing methods, the following various methods may be employed:

(1) to copolymerize a crosslinkable monomer containing at least two double bonds per molecule with the above-described acrylamide or methacrylamide derivatives;

(2) to copolymerize the polymer with an N-alkoxymethyl(methyl)acrylamide derivatives;

(3) to increase the proportion of the above-mentioned hydrophobic monomer and to copolymerize it with acrylamide or methacrylamide derivatives;

(4) to effect polymerization by the bulk polymerization method;

(5) to subject the polymer to a heat treatment;

(6) to integrate the polymer with a water-insoluble fibrous material such as cellulose;

(7) when the polymer contains for example hydroxyl, amino or carboxy groups, to cause such groups with a polyfunctional compound such as epichlorohydrin to insolubilize the polymer; and (8) to copolymerize the monomer represented by the general formula (I) with a monomer containing a substituent group such as a carboxyl group, sulfo group or hydroxyl group having at least one active hydrogen atom, or to form the polymer of the monomer represented by the general formula (I) and a polymer of the above monomer into a polymer complex, thereby insolubilizing the polymer.

The above insolubilizing methods will next be described more specifically.

In the first method, it is possible to use as exemplary crosslinkable monomers N,N'-methylenebisacrylamide, N,N-diallylacrylamide, triacrylic formal, N,N-diacryloylimide, N,N-dimethacryloylimide, ethyleneglycol acrylate, ethyleneglycol dimethacrylate, various polyethyleneglycol diacrylates, various polyethyleneglycol dimethacrylates, propyleneglycol dimethacrylate, propyleneglycol diacrylate, various polypropyleneglycol diacrylates, various polypropyleneglycol dimethacrylates, 1,3-butyleneglycol diacrylate, 1,3-butyleneglycol dimethacrylate, 1,4-butyleneglycol dimethacrylate, glycelol dimethacrylate, neopentylglycol dimethacrylate, trimethylolpropane triacrylate, trimethylolpropane trimethacrylate, trimethylolethane trimethacrylate, trimethylolethane triacrylate, tetramethylolmethane tetramethacrylate, tetramethylolmethane triacrylate, divinylbenzene and diallyl phthalate. The proportion of each of these crosslinkable monomers to the above-described acrylamide derivative may vary depending on the combination of the acrylamide derivative and crosslinkable monomer as well as the desired crosslinking degree. Although not applicable sweepingly to every situation, the crosslinkable monomers may each be used in an amount of 0.01–10 wt.%.

N-Alkoxymethyl(meth)acrylamide derivatives useful in the practice of the second method may include N-hydroxymethyl(meth)acrylamides. For example, N-methylol(meth)acrylamides, N-methoxymethyl(meth)acrylamides, N-ethoxymethyl(meth)acrylamides, N-n-butoxymethyl(meth)acrylamides and N-tert-butoxymethyl(meth)acrylamides may be used. The proportion of each of such N-alkoxymethyl(meth)acrylamide derivatives to the above-described acrylamide derivatives may vary depending on the combination of the acrylamide derivatives and the N-alkoxymethyl(meth)acrylamide derivatives. Although not applicable sweepingly to every combination, the N-alkoxymethyl(meth)acrylamide derivatives may each be used generally in an amount of 0.01–30 wt.%.

In the third method, the proportion of the hydrophobic monomer to the (meth)acrylamide derivative having amphiphilic property may vary depending on the combination of the (meth)acrylamide derivative and the hydrophobic monomer. Although not conclusively limitable, the proportion of the hydrophobic monomer may generally be 1 wt.% or more, or preferably 3 wt.% or more. In this case, the copolymerization may be effected using one of the random copolymerization method, block copolymerization method or graft copolymerization method.

In the fourth method, the polymerization is carried out by the bulk polymerization method. This may be practiced by polymerizing the monomer as is without diluting it with any solvent to obtain a polymer block or by suspending the monomer in a solvent and then effecting the polymerization of the monomer in the form of droplets so as to obtain a granular polymer.

In the fifth method, the polymer is subjected to a heat treatment. The heating conditions may vary depending on the polymer and do not remain constant. However, a polymer obtained by for example bulk polymerization, suspension polymerization or solution polymerization is heat-treated generally at 60°–250° C., or preferably at 80°–200° C. In this case, when the polymer is obtained by the solution polymerization method, its heat treatment may be carried out concurrently with its drying or with the evaporation of the solvent.

Turning to the sixth method in which the polymer is integrated with for example a fibrous material, the above-described (meth)acrylamide derivative may be impregnation- or graft-polymerized to a water-soluble fibrous material such as natural or synthetic fibers such as cellulose fibers, nylon fibers, polyester fibers or acrylic fibers or nonwoven fabric made of polypropylene or an ethylenepropylene copolymer, or to a water-insoluble porous material such as silica, alumina or zeolite. Alternatively, the fibrous or porous material may be impregnated with the polymer.

In the seventh method, the polyfunctional compound such as epichlorohydrin is reacted with the polymer so that the polymer is crosslinked and insolubilized. In this method, it is necessary to introduce hydroxyl, amino or carboxy groups in advance in the polymer. Amino and carboxy groups can be introduced readily by copolymerization. In the case of hydroxyl groups, they may be introduced by copolymerization hydroxyethyl methacrylate, isopropenyl phenol by first introducing for example vinyl acetate or glycidyl methacrylate by the copolymerization method and then saponifying it with a basic material to form hydroxyl groups. Thereafter, the above-prepared polymer and a polyfunctional compound such as epichlorohydrin are reacted to each other so as to crosslink and insolubilize the polymer. When the polymer is insolubilized in an aqueous solution as is, it is converted into an agar-like state. By simply crushing the thus-obtained polymer, it can be used immediately. If it is solubilized after dispersing the aqueous solution in an oil, granular gels are obtained.

According to the eighth method, a polymer complex is formed by copolymerizing the polymer with the above-described monomer containing an active hydrogen or combining the polymer with a copolymer of such a monomer. In this case, it is also possible to form polymer complex by regeneration the active hydrogen atoms of the copolymer which are substituted with ammonium ions or the like on mixing with the other component of the polymer by the addition of an acid then adding an acid to activate the active hydrogen atoms.

The above-described eight methods may be used singly or in combination. Generally speaking, more effective results are obtained when two or more of these methods are used in combination.

As more specific polymerization methods which may be used upon production of water-separating agents of this invention in accordance with the above-mentioned methods, the following polymerization methods may be mentioned by way of example:

(1) to polymerize a monomer as is without diluting it in a solvent and to produce a polymer block;

(2) after polymerizing in a solvent, to dry the resultant polymer or to cause the polymer to precipitate in a poor solvent, thereby obtaining the polymer;

(3) to obtain the polymer as a granular polymer in accordance with the suspension polymerization method;

(4) to obtain the polymer as a polymer latex in accordance with the emulsion polymerization method; and (5) to integrate the polymer with a water-insoluble fibrous material or porous material by impregnation- or graft-polymerizing a solution of the polymer to the water-insoluble fibrous material or porous material.

In the above specific polymerization methods, the polymerization may be initiated only by heating the polymerization systems. However, use of a polymerization initiator can generally bring about better results. No limitation is imposed on the polymerization initiator. Any polymerization initiators may be used as long as they can initiate radical polymerization. For example, inorganic peroxides, organic peroxides, combinations of such peroxides and reducing agents, and azo compounds may be mentioned. More specifically, such polymerization initiators may include ammonium persulfate, potassium persulfate, hydrogen peroxide, tert-butyl peroxide, benzoyl peroxide, cumenehydroxy peroxide, tert-butylperoxy-2-ethylhexanoate, and butyl perbenzoate. As reducing agents which may be used in combination with such polymerization initiators, may be mentioned sulfites, hydrogensulfites, salts of lower valence metals such as iron, copper and cobalt, organic amines such as aniline and reducing sugars such as aldose and ketose. Usable azo compounds may include azobisisobutylonitrile, 2,2'-azobis-2-amidinopropane hydrochloride, 2,2'-azobis-2,4-dimethylvaleronitrile and 4,4'-azobis-4-cyanovaleic acid. Two or more of the above-described polymerization initiators may be used in combination. In this case, the amount of the polymerization initiator to be added may be within the commonly-employed amount range, for example, may be within the range of 0.01-5 wt.%, or preferably 0.05-2 wt.%, both based on the monomer.

Among the thus-obtained polymers, the block-like polymer or the polymer obtained after evaporation of the solvent may be crushed into a powdery water-separating agent or may be melted and then formed into a flake-, fiber- or film-like water-separating agent. The granular polymer may be provided as a granular water-separating agent without need for any further processing. The latex-like polymer may be provided to impregnate and coat a fibrous or porous material such as fabric or paper or may be formed into films to provide a water-separating agent.

In the manner mentioned above, the water-insolubilized polymer or copolymer (hereinafter called "the resin" for the sake or brevity) can be obtained in various forms. The particular form of the resin may suitably be determined depending on how the resin is to be used. When used for example in a form suspended or dispersed in a liquid as in a fluidized bed, it may often be used in the form of powder or beads.

A powdery product may be obtained by various methods as described above, for example, by conducting gel polymerization in an aqueous solution and then drying and grinding the resultant resin. A granular product may generally be produced with ease in accordance with the suspension polymerization method. Since the N-alkyl- or N-alkylene-substituted (meth)acrylamide derivative has generally high solubility in water, suspension polymerization may be practiced as the reversed phase suspension technique in which a monomer or its aqueous solution is dispersed in an oil, as the salted-out suspension polymerization technique in which an electrolyte is dissolved in a large amount in an aqueous solution to reduce the solubility of a monomer, or as the precipitation and suspension polymerization technique in which polymerization is carried out at an elevated temperature of the cloud point of the intended polymer or higher so as to cause the polymer to precipitate. In addition, it is also possible to integrate the polymer with porous beads such as silica, alumina or zeolite, for example, by impregnating the porous beads with a solution of the polymer or effecting graft polymerization on such porous beads. It is also possible to incorporate a third component miscible with the monomer or monomers but immiscible with the resulting polymer when conducting polymerization in accordance with one of the above-mentioned polymerization techniques. Incorporation of such a third component permits production of a porous resin.

The water-separating agent produced by one of the above-mentioned techniques is solid and has such extremely unique properties that it can rapidly absorb water when brought into contact with water in a liquid state and can then retain the thus-absorbed water therein, and undergoes prompt shrinkage even in the presence of a large excess of water and releases the absorbed water when heated. It is also convenient in that the above process of water absorption/retention and water release can be repeated. The amount of water to be absorbed in the water-separating agent varies depending on such factors as the composition of the resin making up the agent, its temperature and the composition of each aqueous solution. It can absorb water as much as 8 to 100 times its own weight at room temperature (25° C.). The amount of water absorbed increases as the temperature drops.

When a low molecular weight (m.w.) material such as an inorganic salt, organic salt, or water-soluble organic material is contained in a dissolved state in an aqueous solution, the aqueous solution may be absorbed in the resin while still containing the low m.w. material. Where an inorganic salt is contained in a dissolved state, the water-absorbing capacity of conventional water-absorbing resins decreases significantly. In the case of an acrylamidesodium acrylate copolymer (content of sodium acrylate: 21 wt.%) crosslinked by methylenebisacrylamide for example, the water absorbed by the copolymer in a 1N aqueous solution of sodium chloride was as little as one seventeenth that absorbed by the same copolymer in distilled water. On the other hand, the percent reduction of the water-separating agent according to this invention is as small as 10% or so. Therefore, it may be concluded that the amount of water which water-separating agents of this invention can absorb are affected only slightly by salts dissolved in the water. Conversely, it has been found that water-separating agents of this invention may absorb more water depending on the type of salt dissolved in the water. Calcium chloride may be mentioned by way of example as such a salt.

As has been mentioned above, the resin of this invention may act in two ways depending on the molecular weight of a solute, i.e., a solution may be absorbed in the gel either together with its solute or without its solute. In other words, the resin has a molecular sieve function. The critical molecular weight varies depending on the composition and temperature of each resin. Where the degree of insolubilization is low and a relatively large amount of water can thus be absorbed because, for example, the crosslinking degree is low or the resin is a copolymer of a hydrophilic or ionic monomer, the critical molecular weight is generally large. On the other hand, where a resin can absorb only a relatively small amount of water because, for example, its crosslinking degree is high or it is a copolymer of a hydrophobic monomer, the critical molecular weight is generally small. Needless to say, when controlling the concentration of an aqueous solution by a resin of this invention, the solute of the aqueous solution must have a molecular weight higher than the critical molecular weight of the resin.

As for the critical weight, it is difficult to give any specific definite value because it changes considerably depending on the composition and temperature of each resin, the composition of each aqueous solution and the type of each material to be concentrated. For example, the critical molecular weight of a resin obtained by crosslinking poly(N-acryloylpyrrolidine) with methylenebisacrylamide is on the order of 1,000 at room temperature when it is used for the concentration of polyethylene glycol. On the other hand, its critical molecular weight is on the order of 10,000 when it is used to concentrate for example a dextran or protein. In other words, the critical molecular weight is dependent on the state of molecules dissolved in an aqueous solution, i.e., the extent of spread of the molecules. Therefore, it is impossible to give a specific value as the critical molecular weight. The critical molecular weight has a certain degree of distribution.

Needless to say, particles or droplets insoluble in water and suspended in water, such as droplets dispersed in emulsions, microorganisms or scum in liquid wastes from fermentation plants cannot be taken into a water absorbing gel of the resin.

When the temperature of the resin is raised after absorption of water, the resin undergoes shrinkage and hence releases the water. If the temperature of the resin is raised further, the shrinkage of the resin becomes extremely slow, i.e., a transition point is observed. This transition point is governed by the composition of each resin. It is generally possible to control the transition points of resins according to this invention within the range of 10°-100° C. The extent of shrinkage of each resin around its transition point varies depending on such factors as the composition of the resin and the composition of an aqueous solution to which the resin is applied. However, it may generally range from 1 to 20 times its own weight. As mentioned above, water may be separated and retained by repeatedly heating and cooling the resin. In this case, the resin may generally be caused to absorb water at a temperature within the range of 0°-100° C. To heat the resin subsequent to its water absorption so that the resin undergoes shrinkage, the heating temperature may generally range from 10° to 200° C. although this temperature will certainly vary depending on what end use is to be made on the resin.

Description will next be made on a specific method for the separation of water. The resin is first brought into contact with an aqueous solution from which one wants to remove water. The resin which has absorbed water therein is separated from the aqueous water, followed by its exposure to an atmosphere of a higher temperature so that the water is released. By repeating this series of operations, the resin can separate a great deal of water. If a low m.w. material is dissolved in the aqueous water, water can be separated as an aqueous solution containing the low m.w. material.

Where the remaining liquid, which has been obtained after the separation of water by the resin in the above process, is to be retained, the above process is considered to be a concentration or dewatering operation. On the other hand, where the thus-separated water is important per se, the above process is considered to be a pure water production process.

In other words, when it is desired to concentrate an aqueous solution, the concentration may be effected by bringing the resin into contact with the aqueous solution and repeating the above-mentioned operation. A great deal of an aqueous solution can be concentrated in this manner. Even if a low m.w. material is present together with a macromolecular material in the aqueous solution at this time, the macromolecular material only will be concentrated without the low m.w. material in the remaining liquid because the resin has a molecular sieve function as mentioned above.

When it is desirous to control the concentration of an aqueous solution with the resin of this invention, the resin is brought into contact with the aqueous solution either as is or after causing the resin to swell with a suitable aqueous solution. The concentration of the aqueous solution may then be adjusted to a desired level by controlling the temperature of the aqueous solution suitably. In this case, a higher temperature permits dilution whereas a lower temperature induces concentration. Then, the resin is separated by for example sedimentation, filtrations, centrifugation or the supernatant is collected, thereby obtaining an aqueous solution of the desired concentration level. In the above manner, the concentration of the aqueous solution may be adjusted to various levels by simply changing the temperature of the aqueous solution in the above-described process. The adjustable concentration range varies depending on the resin to be used, the proportion of the resin to the aqueous solution and the level of a temperature to be used. Although not sweepingly applicable to every situation, it is generally possible to achieve an adjustment range of from about 0.01 to 100 times for each starting aqueous solution. Even if a low m.w. material is present along with a macromolecular material in the aqueous solution, the concentration of the macromolecular material alone will be changed without affecting the concentration of the low m.w. material.

The thus-used resin may be readily regenerated, for example, by rinsing it with water or by heating and shrinking it to release the thus-absorbed water. Thus, the resin can be used repeatedly. It is one of the convenient features of the resin of this invention that it can be regenerated with ease as mentioned above.

The resin of this invention may be applied in various ways, depending on individual purposes. As a basic embodiment, the water-separating agent, which may be in the form of powder, flakes, beads, fibers or film, is first brought into contact with the water contained in an aqueous solution from which one wants to remove water. The water-separating agent is then allowed to absorb water, followed by separation of the water-separating agent from the aqueous solution. As a specific method for causing the agent to absorb water and then separating the water from the aqueous solution, various methods may be employed, including for example to add the water-separating agent directly to the aqueous solution and then to separate the water-absorbed agent by for example sedimentation, filtration or centrifugation; to pack beforehand the water-separating agent in a member which holds the agent separately from the aqueous solution for example in a bag, to bring the agent still in the bag into contact with the aqueous solution to absorb eater therein and then to separate the agent from the aqueous solution; or to process the water-separating agent in for example fibers or plain weaves, to immerse the resulting fabric-like water-separating agent in the aqueous solution so as to allow it to absorb water therein, and then to pull it out of the aqueous solution. The above operations may be carried out many times. Upon effecting the above operations, it is convenient to cause the water-separating agent to absorb water at temperatures as low as feasible, because use of such low temperatures will lead to a larger amount of water being absorbed.

After absorption of water, the water-separating agent is then exposed to at an elevated temperature so as to release the thus-absorbed water. This may be achieved for example by dipping the agent in hot water, blowing a hot gas such as steam against the agent, or allowing the agent to stand in hot air, for example, in a drier. When using the water-separating agent repeatedly, it is effective to remove water from the agent as much as practically feasible from the viewpoint of achieving a higher efficiency in subsequent water separation.

As specific examples of applications of water-separating agents of this invention, may be mentioned concentration of various aqueous solutions, particularly concentration of aqueous solutions containing for example edible materials, amino acids, proteins, polysaccharides or enzymes, the concentration of which is difficult since they are susceptible to denaturation under heat, and concentration of emulsions which cannot be readily concentrated since they are also denatured by heat; crystallization at low temperatures, especially crystallization of materials which are susceptible to thermal denaturation; control of the concentration of aqueous solutions by changing the temperatures of the aqueous solutions to adjust the water-absorbing capacity of resins; and production of pure water from various aqueous solutions, typically, production of pure water from water which contains microorganisms such as bacteria.

It is extremely easy to allow each water-separating agent of this invention to retain water therein. In other words, the water-separating agent can absorb and retain water therein when it is merely brought into contact with water in its liquid state. There is no particular limitation imposed on the shape of the water-separating agent. It may be used in the form of powder, flakes, fibers or film or in a composite form with another fibrous material, depending on its application field or purpose. In this case, it is possible to cause the water-separating agent to release the thus-absorbed water or to absorb additional water by changing its surrounding temperature. The above operation may be repeated as many times as desired. Accordingly, use of the water-separating agent of this invention permits the absorption or release of water without inducing water evaporation, by simply changing its surrounding temperature. Hence, the water-separating agent may be applied to retain water in an extremely wide variety of fields.

As specific applications, may for example be mentioned maintenance of soil under wet conditions; modification of fibers such as acrylic fibers; removal of water from solutions; modification of adhesives; base materials for soft contact lenses; base materials for resins suitable for use in the separation of proteins or enzymes; modification of polymer flocculants; destruction of concrete; raw materials for macromolecular absorbents suitable for use in sanitary products such as sanitary napkins and diapers; raw materials for heavy metal ion adsorbents; solidification of sludge and liquid waste materials; base materials for water-base gels; prevention of dew formation on wall materials and ceiling materials; raw materials for water-cutting sealing agents; and raw materials for fire-retardant and/or noise-insulating construction materials.

Where a low m.w. material is dissolved in an aqueous solution to be retained in a water-separating agent according to this invention, the water-separating agent can also retain the low m.w. material in the form dissolved in the aqueous solution. As a further characteristic feature of the water-separating agent of this invention, it is also mentioned that, even when the agent has already retained water therein, it still permits prompt diffusion of the low m.w. material thereinto from the solution in which the material is dissolved, thereby making the concentration of the material in the solution equal to that in the agent. As specific utilization of such properties, it is possible to apply water-separating agents of this invention for the removal of low m.w. materials from an aqueous solution or emulsion containing macromolecular materials such as proteins along with the low m.w. materials dissolved therein although this separation has heretofore been carried out using for example membranes. For example, water-separating materials of this invention may be applied to the field of purification of macromolecular materials although it has conventionally believed to be difficult to remove for example salts from solutions of such macromolecular materials. In addition, it is also expected that water-separating agents of this invention will find utility as retaining agents for sustained release preparations in view of their ability to permit diffusion of low m.w. materials.

As described above, the water-separating agents of this invention can be readily regenerated by making use of their swelling and shrinkage characteristics which are exhibited when their temperatures are changed. Since the water-separating agents of this invention have excellent properties such that, even in the concurrent presence of an inorganic salt, their water-absorbing capacity are not reduced too much and, even after absorption of water, they still have good shape-retaining properties, they have brought about the following advantageous effects: As the first advantageous effect, the separation of water does not rely upon its phase change such as evaporationor, lyophilization. Corollary to this, they permit water separation at low energy costs. Water separation making use of one or more of the water-separating agents of this invention does not necessarily require large facilities, thereby making it possible to install water-separating facilities at a desired site or location. Second, the water-separating agents of this invention can control the concentrations of aqueous solutions merely by changing their temperatures without developing phase change. Hence, it is possible to minimize the loss of each solute due to its denaturation caused by changes in temperature or phase. Third, the water-separating agents of this invention can absorb and thus separate more water as the temperature decreases. Therefore, they are extremely effective for the concentration or crystallization of aqueous solutions which contain materials susceptible to thermal denaturation. Fourth, the water-separating agents of this invention have molecular sieve functions. Therefore, they can selectively adjust the concentrations of macromolecular materials such as for example proteins and enzymes while leaving unchanged the concentrations of low m.w. compounds such as buffer agents. Fifth, the amounts of water which the water-separating agents of this invention can retain may be reversibly controlled by changing the water temperature suitably. Therefore, it is possible to control the water content of the surrounding atmosphere by adjusting its temperature. Sixth, the absorbed water may be released due to the inherent nature of the resins even in an aqueous solution, provided that the resins are heated. In addition, water may be allowed to diffuse rapidly through the resins because of their inherent nature. Thus, the resins have the advantages that they may be washed with ease and may be repeatedly regenerated for reuse.

This invention will hereinafter be described in further detail by the Examples below. It should however be borne in mind that this invention is not limited to or by the Examples.

EXAMPLE 1

N-Acryloylpyrrolidine containing 1 wt.% of tert-butyl peroxy-2-ethylhexanoate was allowed to stand at 40° C. for 50 hours to effect solventless polymerization, thereby obtaining a block-like polymer. The polymer was then crushed, and a powder portion of particle sizes in the range of 20–100 mesh was collected as a sample. After pouring 1.0 g of the sample into distilled water of a prescribed temperature and then allowing it to stand there so as to swell, the sample was collected by filtering the distilled water through a wire mesh so as to measure the extent of its swelling. Measurement results are given in Table 1.

TABLE 1

| Temperature (°C.) | 9 | 25 | 33 | 40 |
|---|---|---|---|---|
| Extent of swelling (g) | 30.7 | 24.8 | 18.6 | 15.1 |
| Temperature (°C.) | 49 | 58 | 70 | 77 |
| Extent of swelling (g) | 11.4 | 5.5 | 3.6 | 2.7 |

EXAMPLE 2

Poured into a 50-ml graduated cylinder was 1.0 g of the sample powder obtained in Example 1. It was first allowed to swell at room temperature and the volume of its swelling was measured by reading the gradations. Thereafter, the sample was allowed to stand for 15 minutes successively at each of temperatures given in Table 2 in the same order as they appear in the Table. After exposure to each of the temperatures, the volume of swelling was measured. Results are also given in Table 2.

TABLE 2

| Measurement order | 1 | 2 | 3 | 4 | 5 | 6 |
|---|---|---|---|---|---|---|
| Temperature (°C.) | 32 | 25 | 10 | 25 | 32 | 50 |
| Volume of swelling (ml) | 26.7 | 31.6 | 36.4 | 31.8 | 26.7 | 15.8 |
| Measurement order | 7 | 8 | 9 | 10 | 11 | |
| Temperature (°C.) | 58 | 68 | 58 | 50 | 32 | |
| Volume of swelling (ml) | 8.9 | 6.0 | 8.9 | 15.4 | 26.7 | |

EXAMPLES 3–38

Sample powders were obtained respectively by copolymerizing their corresponding monomers given in Table 3 and grinding the resultant copolymers in the same manner as in Example 1. Following the procedure of Example 2, the volumes of swelling of 1.0 g of each sample powder were measured at 25° C. and 50° C. Results are summarized in Table 3.

TABLE 3

| Example | Copolymer composition (wt. %) | Volume of swelling (ml) 25° C. | 50° C. |
|---|---|---|---|
| 3 | N—n-propylacrylamide (99.9)/N,N'—methylenebisacrylamide (0.1) | 15.0 | 5.5 |
| 4 | N—acryloylpyrrolidine (85)/methyl methacrylate (15) | 11.5 | 4.5 |
| 5 | N—acryloylpyrrolidine (99)/ethylene glycol #600 dimethacrylate (1) | 9.0 | 2.5 |
| 6 | N,N—dimethylacrylamide (99.9)/N,N'—methylenebisacrylamide (0.1) | 22.0 | 19.5 |
| 7 | N—acryloylpyrrolidine (90)/N—ethylacrylamide (10) | 24.0 | 6.5 |
| 8 | N—acryloylpyrrolidine (90)/acrylonitrile (10) | 11.5 | 5.5 |
| 9 | N—acryloylpyrrolidine (99)/N,N—diallylacrylamide (1) | 12.0 | 5.0 |
| 10 | N—acryloylpyrrolidine (99)/hydroxyethyl methacrylate (1) | 19.0 | 6.0 |
| 11 | N—acryloylpyrrolidine (90)/vinyl acetate (10) | 15.0 | 6.5 |
| 12 | N—ethylacrylamide (99.9)/N,N'—methylenebisacrylamide (0.1) | 22.0 | 15.0 |
| 13 | N—acryloylpyrrolidine (99)/N—methylolacrylamide (1) | 9.0 | 5.0 |
| 14 | N—acryloylpyrrolidine (90)/APPS-Na[1] (10) | 90.0 | 50.0 (measured at 90° C.) |
| 15 | N—acryloylpyrrolidine (99.9)/N,N'—methylenebisacrylamide (0.1) | 23.0 | 8.0 |
| 16 | N—acryloylpyrrolidine (99.9)/AMPS[2] (0.1) | 30.0 | 13.0 |
| 17 | N—acryloylpyrrolidine (90)/N—acryloylpiperidine (10) | 26.0 | 5.0 |
| 18 | N—acryloylpyrrolidine (95)/methyl methacrylate (5) | 24.0 | 6.0 |
| 19 | N—acryloylpyrrolidine (90)/N,N—dimethylacrylamide (10) | 34.0 | 18.5 |
| 20 | N—acryloylpyrrolidine (99)/vinyl acetate (1) | 31.0 | 8.0 |
| 21 | N—acryloylpyrrolidine (99)/N—methacryloylpiperidine (1) | 32.0 | 7.0 |
| 22 | N—acryloylpyrrolidine (99)/triethyleneglycol diacrylate (1) | 8.0 | 4.0 |
| 23 | N—acryloylpyrrolidine (99)/acrylic acid (1) | 24.0 | 7.5 |
| 24 | N—acryloylpyrrolidine (99)/methacrylic acid (1) | 12.0 | 7.0 |
| 25 | N—acryloylpyrrolidine (99)/polyethyleneglycol #400 dimethacrylate (1) | 8.0 | 5.0 |
| 26 | N—acryloylpyrrolidine (90)/hydroxyethyl acrylate (10) | 16.0 | 6.0 |
| 27 | N—acryloylpyrrolidine (99)/triethyleneglycol dimethacrylate (1) | 8.0 | 4.0 |
| 28 | N—acryloylpyrrolidine (99)/styrene (1) | 18.5 | 6.0 |
| 29 | N—acryloylpyrrolidine (95)/polyethyleneglycol #600 diacrylate (5) | 10.0 | 4.5 |

TABLE 3-continued

| Example | Copolymer composition (wt. %) | Volume of swelling (ml) 25° C. | 50° C. |
|---|---|---|---|
| 30 | N—acryloylpyrrolidine (90)/DMAPMA[3] (10) | 12.0 | 9.5 |
| 31 | N—acryloylpyrrolidine (99)/acrylamide (1) | 28.0 | 12.0 |
| 32 | N—acryloylpyrrolidine (90)/N—n-butylacrylamide (10) | 16.0 | 5.5 |
| 33 | N—acryloylpyrrolidine (99)/N,N'—diacryloylimide (1) | 8.0 | 4.5 |
| 34 | N—acryloylpyrrolidine (99)/polyethyleneglycol #400 diacrylate (1) | 8.0 | 5.0 |
| 35 | N—acryloylpyrrolidine (99)/N—n-hexylacrylamide (1) | 23.0 | 6.0 |
| 36 | N—acryloylpyrrolidine (90)/N—methacryloylpyrrolidine (10) | 34.0 | 11.5 |
| 37 | N—acryloylpyrrolidine (90)/N—vinyl-2-pyrrolidone (10) | 11.5 | 6.5 |
| 38 | N—acryloylpyrrolidine (99)/ethyl acrylate (1) | 20.0 | 6.5 |

Note:
[1] APPS-Na: sodium 2-acrylamido-2-phenyl-propanesulfonate
[2] AMPS: 2-acrylamido-2-methylpropanesulfonic acid
[3] DMAPMA: dimethylaminopropylmethacrylamide

EXAMPLE 39

Added into a Dewar flask was a 30% aqueous solution of N-acryloylpyrrolidine. After purging the solution with nitrogen gas, sodium hydrogensulfite and potassium persulfate were added at 30° C. each in an amount of 0.5 wt.% based on the N-acryloylpyrrolidine. The N-acryloylpyrrolidine was then polymerized adiabatically. The resulting gel was chopped and then dried at 120° C. It was then ground into powder, from which a fraction of 20-100 mesh was collected as a sample. Following the procedure of Example 2, the volumes of swelling of 1.0 g of the sample powder were measured at 25° C. and 50° C. and found to be 22.0 ml and 7.5 ml, respectively.

EXAMPLE 40

A 20% aqueous solution of N-iso-propylacrylamide containing 10,000 ppm of N,N'-methylenebisacrylamide was adiabatically polymerized in the same manner as in Example 39. By conducting subsequent treatments in the same manner as in Example 39, a sample powder was obtained. Following the procedure of Example 2, the volumes of swelling of 1.0 g of the sample powder were measured at 25° C. and 50° C. and found to be 19.0 ml and 11.0 ml, respectively.

EXAMPLES 41–44

To each of the aqueous electrolyte solutions shown in Table 4, 1.0 g of the sample powder obtained in Example 1 was added. In the same manner as in Example 2, the volumes of their swelling were each measured at 30° C. Results are given in Table 4.

TABLE 4

| Example | Electrolyte | Concentration (g/100 g-water) | Volume of Swelling (ml) |
|---|---|---|---|
| 41 | Sodium chloride | 5.8 | 24.4 |
| 42 | Calcium chloride | 1.1 | 30.6 |
| 43 | Ammonium sulfate | 1.3 | 21.9 |
| 44 | Sea water | | 25.5 |

EXAMPLE 45

One gram of the sample obtained in Example 1 was added to 100 ml of a 3.5% aqueous NaCl solution of 30° C. The resultant mixture was then allowed to stand for 1 hour. After that, a measurement of the NaCl concentration in the aqueous solution gave a value of 3.5%. The volume of its swelling at that time was 25.3 ml. Then, it was cooled to 10° C. and allowed to stand for 15 minutes. A measurement of the NaCl concentration in the aqueous solution gave a value of 3.5%. At that time, the volume of its swelling was 33.4 ml. It was then heated to 50° C. and allowed to stand for 15 minutes. A measurement of the NaCl solution in the aqueous solution gave a value of 3.5%. The volume of swelling was 19.5 ml at that time.

EXAMPLE 46

After causing a portion of the sample powder obtained in Example 1 to swell in distilled water, 20 g of the resulting gel was collected. It was then poured into 30 ml of a 5.0% solution of sodium chloride in water, followed by stirring of the resultant mixture. Three minutes later, the concentration of sodium chloride in the aqueous solution was measured in terms of refractive index. It was found to be 3.1%. After collecting the thus-swelled sample by filtration, it was heated to 60° C. to release water. A measurement of the concentration of sodium chloride contained in the released water gave a value of 3.1%.

EXAMPLE 47

At 15° C., 0.5 g of the sample powder obtained in Example 1 was added to 30 g of commercial milk. After stirring the resultant mixture, it was filtered. The weight of the filtrate was 21 g. Thus, 9 g of its water was removed.

EXAMPLE 48

After causing a portion of the sample powder obtained in Example 1 to swell in distilled water, the resultant mixture was filtered through a glass filter. No water was released even when a water-containing gel left on the filter was pressed by a glass plate. Retention of water was thus confirmed.

EXAMPLE 49

After adding 0.2 g of the sample powder obtained in Example 1 to 35 ml of benzene having a water content of 800 ppm and stirring the resultant mixture thoroughly, the water content of the benzene was measured. It was found to have been dropped to 400 ppm.

EXAMPLE 50

A pressurized dewatering test was conducted using digested sludge which had in advance been caused to flocculate with a cationic flocculant as follows: In a cylinder having an inner diameter of 9 cm, a sheet of filter paper, a portion of the sample powder obtained in Example 1, another sheet of filter paper, a portion of the thus-flocculated digested sludge, a further sheet of filter paper, a portion of the sample powder obtained in Example 1 and a still further sheet of filter paper were placed one over another in the above order. It was downwardly pressed at a pressure of 3 kg/cm² for 5 minutes. After pressing for the prescribed time period, the filter paper sheets were peeled off to measure the water content of the sludge. It was found to be 55%.

Another pressurized dewatering test was carried out in a manner similar to that mentioned immediately above, except that a similar portion of the same sludge was sandwiched by filter paper sheets only. The water content of the thus-treated sludge was found to be 61%.

EXAMPLE 51

Added at room temperature to 50 g of an SBR latex having a concentraion of 43% ("Polylac 755", trademark; product of Mitsui-Toatsu Chemicals, Inc.) was 0.5 g of the sample powder obtained in Example 1. The resultant mixture was stirred thoroughly. The mixture was then filtered. The concentration of the SBR latex in the filtrate was found to be 49%.

EXAMPLE 52

Five grams of N-acryloylpyrrolidine were placed in a 5-ml sample tube, followed by the addition of 0.02 g of 5-butyl peroxy-2-ethylhexanoate. A bulk polymerization was effected at 40° C. to obtain a block-like polymer. The polymer was then ground, and a fraction of 20-100 mesh was collected as a sample. Then, 0.5 g of the sample powder was added at room temperature to 50 g of an SBR latex having a concentration of 43% ("Polylac 755", trademark; product of Mitsui-Toatsu Chemicals, Inc.). After stirring the resultant mixture thoroughly, the concentration of the liquid latex was measured. It was found to be 49%. Then, the liquid latex was cooled to 10° C., followed by thorough stirring. Its concentration was measured again and found to be 58%. The liquid latex was thereafter heated to 40° C., at which it was thoroughly stirred. A measurement of its concentration gave a value of 45%. The liquid latex was stirred thoroughly, again at room temperature. Its concentration was measured to be 48%. In addition, the sample powder was microscopically observed both before and after each measurement. It was found that the sample powder had not been ground or otherwise physically damaged by the temperature change or stirring.

EXAMPLE 53

An aqueous solution of N-acryloylpyrrolidine containing 0.5 wt% N,N'-methylenebisacrylamide was prepared by dissolving 507.5 g of N-acryloylpyrrolidine and 2.6 g of N,N'-methylenebisacrylamide in 1,170 g of water. After cooling the aqueous solution to 10° C., it was poured into a 2-1 Dewar flask made of stainless steel. Nitrogen gas was then caused to bubble at a flow rate of 1 l/min. through a ball filter in the aqueous solution for 1 hour. Then, an aqueous solution of 2.55 g of ammonium persulfate dissolved in 10 g of water and another aqueous solution of 1.16 g of sodium hydrogensulfite dissolved in 10 g of water were added simultaneously to the N₂-bubbled aqueous solution, followed by adiabatic polymerization of the reactants. The resultant gel was chopped, dried and ground. A fraction of 20-100 mesh was collected as a sample. Thereafter, 0.5 g of the sample powder was added to 20 ml of a 0.5% aqueous solution of bovine serum albumin. The resulting mixture was stirred at a prescribed temperature for 1 hour. Then, it was allowed to stand for 5 minutes. The absorbance of the resultant supernatant was measured at 254 nm to determine its concentration. The stirring of the sample powder and aqueous solution of bovine serum albumin was effected at 30° C., 15° C. and 5° C. The concentrations of the supernatants corresponding to these temperatures were found to be 0.71% (at 30° C.), 0.78% (at 15° C.) and 0.83% (at 5° C.), respectively. In addition, the sample powder was microscopically observed both before and after each of the above measurements. It was found that the sample powder was not ground or otherwise physically damaged by the temperature change and stirring.

EXAMPLE 54

To 10 g of a solution which had been obtained by dissolving bovine serum albumin in a 0.9% aqueous solution of sodium chloride in such a way that the concentration of the bovine serum albumin had become 1%, was added 10 g of a gel (water content: 9.5 g) obtained by causing a portion of the sample powder of Example 53 to swell in distilled water. After stirring the resultant mixture at room temperature for 15 minutes, the absorbance of the resulting supernatant was measured at 254 nm to determine the concentration of bovine serum albumin in the aqueous solution. The concentration of bovine serum albumin was 0.75%. A measurement of the electric conductivity of the solution gave an NaCl concentration of 0.47%. When the solution was heated to 30° C., the concentration of bovine serum albumin dropped to 0.71%. When it was cooled to 15° C., the concentration increased to 0.78%. A further cooling of the solution to 5° C. increased the concentration of bovine serum albumin further to 0.83% Then, the solution was heated again to room temperature. The concentration of bovine serum albumin decreased to 0.75%. The concentration of sodium chloride was maintained at 0.47% during the above measurements.

EXAMPLES 55-62

Added to 20 g of a 0.5% aqueous solution of polyethylene glycols having each of the molecular weights given in Table 5 was 0.5 g of the sample powder obtained in Example 53. After stirring the thus-prepared mixture at a prescribed temperature for 30 minutes, the refractive index of the resulting supernatant was measured to determine the concentration of the polyethylene glycol in the supernatant. Results are given in Table 5.

TABLE 5

| Ex. | Molecular weight of polyethylene glycol | Concentration of supernatant (%) | | | | |
|---|---|---|---|---|---|---|
| | | 25° C. | 50° C. | 10° C. | 25° C. | 10° C. |
| 55 | 200 | 0.55 | 0.51 | 0.53 | — | — |
| 56 | 600 | 0.52 | 0.54 | 0.52 | — | — |
| 57 | 1,000 | 0.53 | 0.55 | 0.57 | — | — |
| 58 | 2,000 | 0.59 | 0.57 | 0.61 | 0.59 | 0.60 |
| 59 | 4,000 | 0.62 | 0.56 | 0.64 | 0.61 | 0.65 |
| 60 | 6,000 | 0.75 | 0.62 | 0.84 | 0.74 | 0.86 |
| 61 | 11,000 | 0.76 | 0.62 | 0.87 | 0.77 | 0.86 |
| 62 | 20,000 | 0.82 | 0.64 | 0.87 | 0.82 | 0.89 |

EXAMPLES 63-67

Using 0.5 g of the sample powder obtained in Example 53 and 20 ml of a 0.5% aqueous solution of dextrans having each of the molecular weights given in Table 6, the concentration of the corresponding supernatant was measured in the same manner as that employed in Example 55. Results are tabulated in Table 6.

TABLE 6

| Ex. | Molecular weight of dextran | Concentration of supernatant (%) | | |
|---|---|---|---|---|
| | | 50° C. | 25° C. | 10° C. |
| 63 | 180 (fructose) | 0.57 | 0.56 | 0.56 |
| 64 | 9,000 | 0.52 | 0.59 | 0.63 |
| 65 | 40,000 | 0.54 | 0.69 | 0.79 |
| 66 | 460,000 | 0.51 | 0.71 | 0.80 |
| 67 | 2,000,000 | 0.54 | 0.71 | 0.80 |

EXAMPLES 68–71

Using 10 g of a gel (water content: 9.5 g) obtained by causing the sample powder of Example 53 to swell in distilled water and 10 g of a 1% aqueous solution of dextrans having each of the molecular weights shown in Table 7, the concentrations of the dextran in the corresponding supernatant was measured in the same manner as that employed in Example 55. Results are shown in Table 7.

TABLE 7

| Ex. | Molecular weight of dextran | Concentration of supernatant (%) | | | | |
|---|---|---|---|---|---|---|
| | | 25° C. | 50° C. | 10° C. | 25° C. | 10° C. |
| 68 | 9,000 | 0.59 | 0.52 | 0.63 | 0.52 | 0.64 |
| 69 | 40,000 | 0.69 | 0.54 | 0.79 | 0.68 | 0.79 |
| 70 | 460,000 | 0.71 | 0.51 | 0.80 | 0.71 | 0.80 |
| 71 | 2,000,000 | 0.71 | 0.54 | 0.80 | 0.70 | 0.82 |

EXAMPLES 72–76

Using 0.05 g of the sample powder obtained in Example 53 and 2 ml of a 0.5% aqueous solution of proteins having each of the molecular weights given in Table 8, the concentration of the protein in the corresponding supernatant was measured in the same manner as that followed in Example 53. Results are shown in Table 8.

TABLE 8

| Ex. | Protein | | Concentration of supernatant (%) | | |
|---|---|---|---|---|---|
| | Name | m.w. | 30° C. | 20° C. | 10° C. |
| 72 | Lysozyme | 14,300 | 0.51 | 0.69 | 0.83 |
| 73 | β-lactoglobulin | 18,400 | 0.62 | 0.66 | 0.76 |
| 74 | Trypsinogen | 24,000 | 0.53 | 0.56 | 0.62 |
| 75 | Pepsin | 34,700 | 0.52 | 0.61 | 0.77 |
| 76 | Egg white albumin | 45,000 | 0.67 | 0.70 | 0.76 |

EXAMPLE 77

Using a 30% aqueous solution of N-n-propylacrylamide which contained 0.5 wt.% of N,N-methylenebisacrylamide, a sample powder was obtained in the same manner as that employed in Example 53. Using 0.6 g of the sample powder and 20 ml of a 0.5% aqueous solution of bovine serum albumin, the concentration of bovine serum albumin in the aqueous solution was measured at various temperatures in accordance with the method used in Example 53. The concentrations were found to be 0.63% (at 30° C.), 0.70% (at 15° C.) and 0.84% (at 5° C.), respectively.

EXAMPLE 78

Using 10 g of a gel (water content: 9.4 g) obtained by causing a portion of the sample powder of Example 77 to swell in distilled water, the concentration of bovine serum albumin was measured at various temperatures in the same manner as that used in Example 54. The concentration was 0.65% at room temperature. When heated to 30° C., it dropped to 0.63%. When cooled to 15° C., it increased to 0.70%. When the solution was cooled further to 5° C., the concentration increased to 0.84%. It however dropped to 0.69% when heated again to room temperature. During these measurements, the concentration of sodium chloride remained constant at 0.46%.

EXAMPLES 79–83

Using 0.6 g of the sample powder obtained in Example 77 and 20 g of a 0.5% aqueous solution of polyethylene glycols having each of the molecular weights given in Table 9, the concentration of the polyethylene glycol in the corresponding supernatant was measured in the same manner as that used in Example 55. Results are shown in Table 9.

TABLE 9

| Ex. | Molecular weight of polyethylene glycol | Concentration of supernatant (%) | | | | |
|---|---|---|---|---|---|---|
| | | 25° C. | 50° C. | 10° C. | 50° C. | 25° C. |
| 79 | 1,000 | 0.54 | 0.51 | 0.52 | — | — |
| 80 | 2,000 | 0.56 | 0.56 | 0.56 | — | — |
| 81 | 4,000 | 0.59 | 0.55 | 0.59 | 0.54 | 0.58 |
| 82 | 6,000 | 0.65 | 0.59 | 0.74 | 0.59 | 0.64 |
| 83 | 11,000 | 0.64 | 0.54 | 0.71 | 0.52 | 0.65 |

EXAMPLES 84–88

Using 0.6 g of the sample powder obtained in Example 77 and 20 ml of a 0.5% aqueous solution of dextrans having each of the molecular weights given in Table 10, the concentration of the dextran in the corresponding supernatant was measured in the same manner as that employed in Example 55. Results are given in Table 10.

TABLE 10

| Ex. | Molecular weight of dextran | Concentration of supernatant (%) | | |
|---|---|---|---|---|
| | | 50° C. | 25° C. | 10° C. |
| 84 | 180 (fructose) | 0.51 | 0.54 | 0.52 |
| 85 | 9,000 | 0.54 | 0.62 | 0.62 |
| 86 | 40,000 | 0.52 | 0.63 | 0.63 |
| 87 | 460,000 | 0.53 | 0.66 | 0.80 |
| 88 | 2,000,000 | 0.54 | 0.67 | 0.76 |

EXAMPLES 89–92

Using 10 g of a gel (water content: 9.4 g) obtained by causing a portion of the sample power of Example 77 in distilled water and 10 g of a 1% aqueous solution of dextrans having each of the molecular weights given in Table 11, the concentration of the dextran in the corresponding supernatant was measured in the same manner as that used in Example 55. Results are given in Table 11.

TABLE 11

| Ex. | Molecular weight of dextran | Concentration of supernatant (%) | | | | |
|---|---|---|---|---|---|---|
| | | 25° C. | 50° C. | 10° C. | 25° C. | 10° C. |
| 89 | 9,000 | 0.62 | 0.54 | 0.62 | 0.61 | 0.64 |
| 90 | 40,000 | 0.63 | 0.52 | 0.63 | 0.60 | 0.63 |

TABLE 11-continued

| Ex. | Molecular weight of dextran | Concentration of supernatant (%) | | | | |
|---|---|---|---|---|---|---|
| | | 25° C. | 50° C. | 10° C. | 25° C. | 10° C. |
| 91 | 460,000 | 0.66 | 0.53 | 0.80 | 0.65 | 0.80 |
| 92 | 2,000,000 | 0.67 | 0.54 | 0.76 | 0.67 | 0.77 |

EXAMPLES 93-97

Using 0.06 g of the sample powder obtained in Example 77 and 2 ml of a 0.5% aqueous solution of proteins having each of the molecular weights given in Table 12, the concentration of the protein in the corresponding supernatant was measured in the same manner as in Example 53. Results are given in Table 12.

TABLE 12

| Ex. | Protein | | Concentration of supernatant (%) | | |
|---|---|---|---|---|---|
| | Name | m.w. | 30° C. | 20° C. | 10° C. |
| 93 | Lysozyme | 14,300 | 0.53 | 0.56 | 0.61 |
| 94 | β-lactoglobulin | 18,400 | 0.52 | 0.67 | 0.85 |
| 95 | Trypsinogen | 24,000 | 0.53 | 0.62 | 0.80 |
| 96 | Pepsin | 34,700 | 0.55 | 0.64 | 0.80 |
| 97 | Egg white albumin | 45,000 | 0.54 | 0.68 | 0.82 |

EXAMPLES 98-102

After subjecting an aqueous solution of N-acryloylpyrrolidine, which contained 4.7 wt.% of sodium 2-acrylamido-2-phenylpropanesulfonate, to salting-out suspension polymerization by using mirabilite, the resulting gel beads were dried to obtain a sample. The sample beads were caused to swell in distilled water to form a gel. Using 10 g of the thus-prepared gel (water content: 9.75 g) and 10 g of a 1% aqueous solution of polyethylene glycols having each of the molecular weights shown in Table 13, the concentration of the polyethylene glycol in the corresponding supernatant was measured in the same manner as that followed in Example 55. Results are given in Table 13.

TABLE 13

| Ex. | Molecular weight of polyethylene glycol | Concentration of supernatant (%) | | | | |
|---|---|---|---|---|---|---|
| | | 25° C. | 50° C. | 10° C. | 25° C. | 10° C. |
| 98 | 2,000 | 0.62 | 0.61 | 0.64 | 0.62 | 0.65 |
| 99 | 4,000 | 0.65 | 0.65 | 0.69 | 0.66 | 0.70 |
| 100 | 6,000 | 0.74 | 0.70 | 0.84 | 0.74 | 0.83 |
| 101 | 11,000 | 0.79 | 0.68 | 0.87 | 0.79 | 0.87 |
| 102 | 20,000 | 0.84 | 0.67 | 0.95 | 0.84 | 0.96 |

EXAMPLES 103-106

Using 0.25 g of the sample beads obtained in Example 98 and 20 g of a 0.5% aqueous solution of dextrans having each of the molecular weights shown in Table 14, the concentration of the dextran in the corresponding supernatant was measured in the same manner as that used in Example 55. Results are shown in Table 14.

TABLE 14

| Ex. | Molecular weight of dextran | Concentration of supernatant (%) | | | | |
|---|---|---|---|---|---|---|
| | | 25° C. | 50° C. | 10° C. | 50° C. | 25° C. |
| 103 | 9,000 | 0.60 | 0.59 | 0.62 | 0.57 | 0.60 |
| 104 | 40,000 | 0.80 | 0.63 | 0.90 | 0.63 | 0.80 |
| 105 | 460,000 | 0.98 | 0.66 | 1.18 | 0.65 | 0.97 |
| 106 | 2,000,000 | 1.02 | 0.68 | 1.23 | 0.69 | 1.02 |

EXAMPLE 107

Added at 15° C. to 30 g of commercial milk was 0.5 g of the sample beads obtained in Example 98. After stirring the resultant mixture, it was filtered. The weight of the resultant filtrate was 18 g. Thus 12 g of water was removed.

EXAMPLE 108

To 50 g of an SBR latex having a concentration of 43% ("Polylac 755", trademark; product of Mitsui-Toatsu Chemicals, Inc.), 0.5 g of the sample beads obtained in Example 98 was added at room temperature. The resultant mixture was stirred at the same temperature. After stirring it thoroughly, it was filtered. The concentration of the SRB latex in the filtrate was found to be 52%.

EXAMPLES 109-113

Using 0.25 g of the sample beads obtained in Example 98 and 20 ml of a 0.5% aqueous solution of polyethylene glycols having each of the molecular weights shown in Table 15, the concentration of polyethylene glycol in the corresponding supernatant was measured in the same manner as in Example 55. Results are given in Table 15.

TABLE 15

| Ex. | Molecular weight of polyethylene glycol | Concentration of supernatant (%) | | |
|---|---|---|---|---|
| | | 50° C. | 25° C. | 10° C. |
| 109 | 2,000 | 0.61 | 0.62 | 0.64 |
| 110 | 4,000 | 0.65 | 0.65 | 0.69 |
| 111 | 6,000 | 0.70 | 0.74 | 0.84 |
| 112 | 11,000 | 0.68 | 0.79 | 0.87 |
| 113 | 20,000 | 0.67 | 0.84 | 0.95 |

EXAMPLES 114-117

Using 0.25 g of the sample beads obtained in Example 98 and 20 ml of a 0.5% aqueous solution of dextrans having each of the molecular weights given in Table 16, the concentration of the dextran in the corresponding supernatant was measured in the same manner as in Example 55. Results are given in Table 16.

TABLE 16

| Ex. | Molecular weight of dextran | Concentration of supernatant (%) | | |
|---|---|---|---|---|
| | | 50° C. | 25° C. | 10° C. |
| 114 | 9,000 | 0.59 | 0.60 | 0.62 |
| 115 | 40,000 | 0.63 | 0.80 | 0.90 |
| 116 | 460,000 | 0.66 | 0.98 | 1.18 |
| 117 | 2,000,000 | 0.68 | 1.02 | 1.23 |

EXAMPLE 118

To a benzene solution containing 5 wt.% of N-acryloylpyrrolidine, azobisisobutylonitrile was added in an amount of 1.0 wt.% based on N-acryloylpyrrolidine. The reactants were allowed to undergo polymerization at 60° C. for 5 hours and under a nitrogen gas stream.

After polymerization, 5 sheets of polypropylene-made non-woven fabric ("Neunetz", trademark; product of Mitsui-Toatsu Chemicals, Inc.) were superposed and then dipped in the benzene solution for impregnation with the benzene solution. Thereafter, the non-woven fabric was then withdrawn from the benzene solution and allowed to stand for 10 hours in a drier maintained at 150° C. After drying, the non-woven fabric was readily broken into a pulp-like form when pressed by fingers. After causing 1.0 g of the pulp-like sample to be suspended in distilled water, the resulting suspension was filtered. The weight of the sample was found to be 3.1 g. Thus the sample had absorbed 2.1 g of water.

EXAMPLE 119

A 30% aqueous solution of N-acryloylmorpholine, which contained 5,000 ppm of N,N'-methylenebisacrylamide, was charged in a Dewar flask and then purged with nitrogen gas. Thereafter, 2,2'-azobis(2-amidinopropane) hydrochloride was added at 20° C. in an amount of 1.3% based on the N-acryloylmorpholine. The reactants were subjected to adiabatic polymerization. The resulting gel was chopped and then dried at 120° C. It was thereafter ground, and a fraction of 20–100 mesh was collected as a sample. Following the procedure of Example 2, the volumes of swelling of 1.0 g of the sample powder were measured at 25° C. and 50° C. and found to be 14.5 ml and 11.5 ml, respectively.

EXAMPLE 120

A sample powder was obtained by conducting polymerization and grinding in the same manner as in Example 119 except that N-ethylmethacrylamide was used in place of N-acryloylmorpholine and the polymerization initiator was added at 50° C. In the same manner as that used in Example 2, the volumes of swelling of 1.0 g of the sample powder were measured at 25° C. and 50° C. and found to be 18.5 ml and 13.5 ml, respectively.

EXAMPLE 121

A sample powder was obtained by conducting polymerization and grinding in the same manner as in Example 119 except that a 30% aqueous solution of N-n-propylmethacrylamide (50%) and N,N-dimethylacrylamide (50%), which contained 10,000 ppm of N,N'-methylenebisacrylamide was used as monomer solution and potassium persulfate and sodium bisulfite were used as the polymerization initiator in amounts of 1.5% and 0.69% based on the monomers respectively, then the polymerization initiators were added at 30° C. In the same manner as that used in Example 2, the volumes of swelling of 1.0 g of the sample powder were measured at 25° C. and 50° C. and found to be 28.0 ml and 21.0 ml, respectively.

COMPARATIVE EXAMPLE 1

A 30% solution of N-n-butylacrylamide, which contained 5,000 ppm of N,N'-methylenebisacrylamide, in N,N-dimethylformamide, was charged in a Dewar flask. After purging the solution with nitrogen gas, azobisisobutylonitrile was added at 30° C. in an amount of 1.5%. The reactants were subjected to adiabatic polymerization. The thus-obtained gel was chopped and dried at 120° C. It was then ground, and a fraction of 20–100 mesh was collected as a sample. Following the same procedure as in Example 1, the weights of swelling of 1.0 g of the sample powder were measured at 25° C. and 50° C. and found to be 2.2 g and 2.0 g, respectively.

COMPARATIVE EXAMPLE 2

A sample powder was obtained by conducting polymerization and grinding in the same manner as in Comparative Example 1 except that N,N-diethylacrylamide was used in place of N-n-butylacrylamide. In the same manner as that used in Example 1, the weights of swelling of 1.0 g of the sample powder were measured at 25° C. and 50° C. and found to be 4.8 g and 2.5 g, respectively.

COMPARATIVE EXAMPLE 3

A sample powder was obtained by conducting polymerization and grinding in the same manner as in Comparative Example 1 except that N-acryloylpiperidine was used in place of N-n-butylacrylamide. In the same manner as that used in Example 1, the weights of swelling of 1.0 g of the sample powder were measured at 25° C. and 50° C. and found to be 3.3 g and 2.3 g, respectively.

What is claimed is:

1. A method for the extraction of water from aqueous macromolecular solution or emulsion comprising contacting said aqueous solution or emulsion with an agent for absorbing and releasing water, said agent comprising: a water-insolubilized resin of a polymer of at least one monomer selected from N-alkyl- or N-alkylene-substituted acrylamides or methacrylamides represented by the following general formula (I):

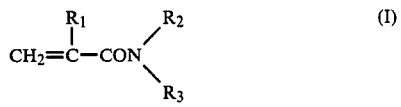

wherein $R_1$ and $R_2$ are individually a hydrogen atom or methyl group and $R_3$ is a methyl, ethyl or propyl group, with the proviso that $R_3$ is an ethyl or propyl group when $R_2$ is a hydrogen atom, and that $R_3$ is a methyl or ethyl group when $R_2$ is a methyl group, or wherein $R_2$ and $R_3$ are $-(CH_2)_4-$ or $-(CH_2)_2O-(CH_2)_2-$ in combination; or a copolymer of at least one monomer selected from said acrylamides or methacrylamides and one or more other copolymerizable monomers selected from the group consisting of hydrophilic, ionic and hydrophobic monomers; said agent having a weight of absorbed water ranging from 8 to 100 times its own weight up to the transition temperature point of said agent; and having a weight of absorbed water ranging from 1 to 20 times its own weight above the transition temperature point of said agent, and undergoes shrinkage even in the presence of a large excess of water to release already-absorbed water.

2. The process as claimed in claim 1 wherein said aqueous solution or emulsion contains a synthetic macromolecular compound or edible substance.

3. The process of claim 1 wherein said aqueous solution or emulsion contains a protein, polysaccharide, enzyme, antibiotic or microorganism.

4. The process of claim 1 wherein said agent is added to the aqueous solution or emulsion and, after water absorption thereby, the water-containing agent is removed from the aqueous solution or emulsion, is exposed to an atmosphere above the transition point of said agent so that the water is released, and then the released water is separated from the agent.

* * * * *